US012031548B2

(12) United States Patent
Iwakiri

(10) Patent No.: US 12,031,548 B2
(45) Date of Patent: Jul. 9, 2024

(54) SCROLL STRUCTURE OF CENTRIFUGAL COMPRESSOR AND CENTRIFUGAL COMPRESSOR

(71) Applicant: MITSUBISHI HEAVY INDUSTRIES ENGINE & TURBOCHARGER, LTD., Sagamihara (JP)

(72) Inventor: Kenichiro Iwakiri, Tokyo (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 76 days.

(21) Appl. No.: 17/623,054

(22) PCT Filed: Jul. 16, 2019

(86) PCT No.: PCT/JP2019/027917

§ 371 (c)(1),
(2) Date: Dec. 27, 2021

(87) PCT Pub. No.: WO2021/009843

PCT Pub. Date: Jan. 21, 2021

(65) Prior Publication Data

US 2022/0228602 A1 Jul. 21, 2022

(51) Int. Cl.

*F04D 29/44* (2006.01)
*F01D 9/02* (2006.01)
(Continued)

(52) U.S. Cl.

CPC ........... *F04D 29/441* (2013.01); *F01D 9/026* (2013.01); *F02B 39/00* (2013.01);
(Continued)

(58) Field of Classification Search

CPC ........ F04D 29/44; F04D 29/441; F04D 17/10; F01D 9/026
See application file for complete search history.

(56) References Cited

U.S. PATENT DOCUMENTS 3,825,028 A * 7/1974 Herrmann ............. F16K 27/041
137/625.68
9,541,094 B2 1/2017 Iwakiri et al.
(Continued)

FOREIGN PATENT DOCUMENTS

CN 101668954 A 3/2010
CN 108700090 A 10/2018
(Continued)

OTHER PUBLICATIONS

International Preliminary Report on Patentability and Written Opinion of the International Searching Authority for International Application No. PCT/JP2019/027917, dated Jan. 27, 2022, with an English translation.

(Continued)

*Primary Examiner* — Woody A Lee, Jr.
*Assistant Examiner* — Cameron A Corday
(74) *Attorney, Agent, or Firm* — Birch, Stewart, Kolasch & Birch, LLP

(57) ABSTRACT

A scroll structure of a centrifugal compressor includes, of a flow passage connection section where a scroll start portion and a scroll end portion of a scroll flow passage intersect, a connection region where a first inner circumferential surface of the scroll end portion in the centrifugal compressor and a second inner circumferential surface of the scroll start portion in the centrifugal compressor are connected. The connection region includes a turning start point where a direction starts to change from the first inner circumferential surface toward the second inner circumferential surface, and a turning end point where the change in direction from the first inner circumferential surface toward the second inner circumferential surface comes to an end. Where a cross-section orthogonal to an extension direction of a center line of the scroll flow passage in the connection region is a first (Continued)

cross-section, the turning start point on the first cross-section is a first turning start point, a turning end point on the first cross-section is a first turning end point, and a tangent line to the first inner circumferential surface passing through the first turning start point on the first cross-section is a first direction, the first turning start point exists at a position away from the first turning end point along the first direction by a distance not less than 30% of a height dimension along an axial direction of the centrifugal compressor at a minimum cross-sectional area position of the scroll flow passage.

5 Claims, 8 Drawing Sheets

(51) Int. Cl.
*F02B 39/00* (2006.01)
*F04D 29/42* (2006.01)

(52) U.S. Cl.
CPC ...... *F04D 29/4206* (2013.01); *F05D 2220/40* (2013.01); *F05D 2240/14* (2013.01); *F05D 2250/52* (2013.01)

(56) References Cited

U.S. PATENT DOCUMENTS

| | | | | |
|---|---|---|---|---|
| 2010/0226766 | A1* | 9/2010 | Eguchi .................. | F04D 29/422<br>415/206 |
| 2011/0031786 | A1 | 2/2011 | Kurokawa et al. | |
| 2016/0138608 | A1 | 5/2016 | Bessho | |
| 2019/0055959 | A1 | 2/2019 | Iwakiri et al. | |
| 2020/0173460 | A1 | 6/2020 | Ueno et al. | |

FOREIGN PATENT DOCUMENTS

| | | | |
|---|---|---|---|
| JP | 5479316 | B2 | 4/2014 |
| WO | WO 2010/113391 | A1 | 10/2010 |
| WO | WO 2015/019909 | A1 | 2/2015 |
| WO | WO 2018/003835 | A1 | 1/2018 |

OTHER PUBLICATIONS

International Search Report for International Application No. PCT/JP2019/027917, dated Oct. 1, 2019.

* cited by examiner

SCROLL STRUCTURE OF CENTRIFUGAL COMPRESSOR AND CENTRIFUGAL COMPRESSOR

TECHNICAL FIELD

The present disclosure relates to a scroll structure of a centrifugal compressor and the centrifugal compressor.

BACKGROUND

A centrifugal compressor used in a compressor part or the like of a turbocharger for an automobile or a ship imparts kinetic energy to a fluid through rotation of an impeller and discharges the fluid radially outward, thereby achieving a pressure increase by utilizing the centrifugal force.

Such a centrifugal compressor is required of the high pressure ratio and high efficiency in a broad operational range.

The centrifugal compressor is provided with a scroll flow passage formed into a scroll shape. The scroll flow passage includes a flow passage connection section where a scroll start portion and a scroll end portion intersect.

At a high-flow operating point, an accelerating flow is formed from the scroll start portion to the scroll end portion of the scroll, and a pressure in the scroll start portion is higher than a pressure in the scroll end portion, rarely causing a recirculation flow from the scroll end portion to the scroll start portion in the flow passage connection section.

However, at a low-flow operating point, a decelerating flow is formed from the scroll start portion to the scroll end portion of the scroll, and the pressure in the scroll start portion is lower than the pressure in the scroll end portion, causing the recirculation flow from the scroll end portion to the scroll start portion in the flow passage connection section. The above phenomenon causes a separation loss or the like in the scroll.

That is, a fluid flow direction is changed in the flow passage connection section when the recirculation flow flows into the scroll start portion from the scroll end portion, causing the loss if the fluid separates from a wall surface forming the scroll flow passage in the scroll start portion.

Thus, for example, in a scroll structure of a centrifugal compressor described in Patent Document 1, the above-described loss is suppressed by changing the cross-sectional shape of the flow passage connection section (see Patent Document 1).

CITATION LIST

Patent Literature

Patent Document 1: JP5479316B

SUMMARY

Technical Problem

For example, in the scroll structure of the centrifugal compressor described in Patent Document 1, a recirculation flow is suppressed by decreasing a cross-sectional area of the flow passage connection section, thereby suppressing the above-described loss. However, for example, in the scroll structure of the centrifugal compressor described in Patent Document 1, even though the loss due to the separation can be suppressed, the flow passage cross-sectional area in the scroll start portion is decreased, which may result in an excessive flow velocity and an increase in loss.

In view of the above, an object of at least one embodiment of the present invention is to provide a scroll structure of a centrifugal compressor where efficiency increases in a broad operational range, and the centrifugal compressor.

Solution to Problem (1) A scroll structure of a centrifugal compressor according to at least one embodiment of the present invention is a scroll structure of a centrifugal compressor provided with a scroll flow passage formed into a scroll shape, which includes, of a flow passage connection section where a scroll start portion and a scroll end portion of the scroll flow passage intersect, a connection region where a first inner circumferential surface of the scroll end portion in the centrifugal compressor and a second inner circumferential surface of the scroll start portion in the centrifugal compressor are connected. The connection region includes a turning start point where a direction starts to change from the first inner circumferential surface toward the second inner circumferential surface, and a turning end point where the change in direction from the first inner circumferential surface toward the second inner circumferential surface comes to an end. Where a cross-section orthogonal to an extension direction of a center line of the scroll flow passage in the connection region is a first cross-section, the turning start point on the first cross-section is a first turning start point, a turning end point on the first cross-section is a first turning end point, and a tangent line to the first inner circumferential surface passing through the first turning start point on the first cross-section is a first direction, the first turning start point exists at a position away from the first turning end point along the first direction by a distance not less than 30% of a height dimension along an axial direction of the centrifugal compressor at a minimum cross-sectional area position of the scroll flow passage.

In the above-described connection region in the flow passage connection section, an extension direction of the inner circumferential surface of the scroll flow passage changes relatively largely from the first inner circumferential surface of the scroll end portion in the centrifugal compressor to the second inner circumferential surface of the scroll start portion in the centrifugal compressor. Thus, the fluid flowing along the first inner circumferential surface is likely to separate from the second inner circumferential surface when flowing into the scroll start portion as the recirculation flow.

To cope therewith, in the above configuration (1), the first turning start point exists at the position away from the first turning end point along the first direction by the distance not less than 30% of the height dimension along the axial direction at the minimum cross-sectional area position of the scroll flow passage. Thus, the change in direction of the inner circumferential surface of the scroll flow passage changing from the first inner circumferential surface to the second inner circumferential surface becomes slow, the fluid flowing along the first inner circumferential surface is unlikely to separate from the second inner circumferential surface when flowing into the scroll start portion as the recirculation flow, making it possible to suppress the loss associated with the separation. Therefore, in the centrifugal compressor, it is possible to increase efficiency in a broad operational range.

(2) In some embodiments, in the above configuration (1), at least at an intermediate position between the first turning start point and the first turning end point, the connection region exists at the same position as a virtual inscribed circle or at a position on a center side of the virtual inscribed circle relative to the position in question, the virtual inscribed circle being in contact with the first inner circumferential surface at the first turning start point and in contact with a virtual line obtained by extending the second inner circumferential surface at the first turning end point along an extension direction of the scroll flow passage.

Causing the connection region to have the above configuration (2), the change in direction of the inner circumferential surface of the scroll flow passage changing from the first inner circumferential surface to the second inner circumferential surface becomes slow, the fluid flowing along the first inner circumferential surface is unlikely to separate from the second inner circumferential surface when flowing into the scroll start portion as the recirculation flow, making it possible to suppress the loss associated with the separation.

(3) In some embodiments, in the above configuration (1) or (2), the first turning end point is located on a downstream side of the scroll flow passage relative to a position where a virtual inscribed circle contacts a virtual line obtained by extending the second inner circumferential surface at the first turning end point along an extension direction of the scroll flow passage, the virtual inscribed circle being in contact with the first inner circumferential surface at the first turning start point and in contact with the virtual line.

With the above configuration (3), as compared with a case in which the first turning end point is set at the position where the above-described virtual inscribed circle contacts the above-described virtual line, it is possible to set the position of the first turning end point on the downstream side of the scroll flow passage. Thus, the change in direction of the inner circumferential surface of the scroll flow passage changing from the first inner circumferential surface to the second inner circumferential surface becomes slower. Thus, the fluid flowing along the first inner circumferential surface is more unlikely to separate from the second inner circumferential surface when flowing into the scroll start portion as the recirculation flow, making it possible to further suppress the loss associated with the separation.

(4) In some embodiments, in any one of the above configurations (1) to (3), the connection region may include a curved portion ranging from the first turning start point to the first turning end point.

(5) In some embodiments, in the above configuration (4), the curved portion has a curvature radius gradually increasing from the first turning start point toward the first turning end point.

With the above configuration (5), the change in direction of the inner circumferential surface of the scroll flow passage changing from the first inner circumferential surface to the second inner circumferential surface becomes slow toward the second inner circumferential surface. Thus, the fluid flowing along the first inner circumferential surface is more unlikely to separate from the second inner circumferential surface when flowing into the scroll start portion as the recirculation flow, making it possible to further suppress the loss associated with the separation.

(6) In some embodiments, in any one of the above configurations (1) to (3), the connection region may include a straight line portion in at least a partial area ranging from the first turning start point to the first turning end point.

(7) In some embodiments, in any one of the above configurations (1) to (6), the connection region includes an area where a ratio (a2/a1) of a distance a2 from a straight line L to a farthest position on the connection region to a distance a1 of the straight line L decreases from a downstream side toward an upstream side along the extension direction of the center line of the scroll flow passage, the straight line L joining the first turning start point and the first turning end point.

The above-described connection region extends along the extension direction of the center line of the scroll flow passage in the scroll end portion (first inner circumferential surface), as the scroll end portion is viewed from the radially outer side of the centrifugal compressor.

As a result of intensive researches by the present inventors, it was found that the separation is more likely to occur in the fluid flowing into the scroll start portion from the upstream area of the connection region along the extension direction than in the fluid flowing into the scroll start portion from the downstream area of the connection region along the extension direction.

With the above configuration (7), since the connection region includes the area where the above-described ratio (a2/a1) decreases from the downstream side toward the upstream side along the extension direction of the center line of the scroll flow passage, an area exists where the change in direction of the inner circumferential surface of the scroll flow passage changing from the first inner circumferential surface to the second inner circumferential surface becomes slow from the downstream side toward the upstream side along the extension direction.

Therefore, with the above configuration (7), it is possible to effectively suppress occurrence of the separation.

(8) In some embodiments, in the above configuration (7), the ratio (a2/a1) takes a minimum value in an area, of the connection region, on the upstream side of the scroll flow passage relative to a position of a tongue portion.

As described above, the above-described separation is more likely to occur in the fluid flowing into the scroll start portion from the upstream area of the connection region along the extension direction of the center line of the scroll flow passage than in the fluid flowing into the scroll start portion from the downstream area of the connection region along the extension direction.

With the above configuration (8), since the above-described ratio (a2/a1) takes the minimum value in the area, of the connection region, on the upstream side of the scroll flow passage relative to the position of the tongue portion, the change in direction of the inner circumferential surface of the scroll flow passage changing from the first inner circumferential surface to the second inner circumferential surface becomes slow in the region on the upstream side.

Therefore, with the above configuration (8), it is possible to effectively suppress occurrence of the separation.

(9) In some embodiments, in the above configuration (7) or (8), the ratio (a2/a1) takes a minimum value in an area, of the connection region, on the upstream side of the scroll flow passage relative to a position on a most upstream side in the axial direction.

The above-described connection region first heads for the axially upstream side of the centrifugal compressor to reach the position on the most upstream side in the axial direction, and then extends toward the axially downstream side, as the connection region moves from the most downstream side toward the upstream side along the extension direction of the center line of the scroll flow passage.

Further, as described above, the above-described separation is more likely to occur in the fluid flowing into the scroll start portion from the area of the connection region on the upstream side along the extension direction than in the fluid flowing into the scroll start portion from the area of the connection region on the downstream side along the extension direction. However, an area of the scroll start portion suffering the most from the loss due to the separation in the scroll flow passage is an area reached by the fluid passing through the connection region at the position on the upstream side along the extension direction of the center line of the flow passage relative to the above-described "position on the most upstream side in the axial direction".

Therefore, disposing the connection region to have the above configuration (9), the change in direction of the inner circumferential surface of the scroll flow passage changing from the first inner circumferential surface to the second inner circumferential surface can be made much slower in an area of the connection region which is passed by the fluid flowing into the area where the loss due to the separation is relatively large. Thus, it is possible to effectively suppress occurrence of the separation.

(10) A centrifugal compressor according to at least one embodiment of the present invention includes the scroll structure of the centrifugal compressor according to any one of the above configurations (1) to (9), making it possible to increase efficiency in a broad operational range.

Advantageous Effects

According to at least one embodiment of the present invention, it is possible to increase efficiency in a broad operational range in a centrifugal compressor.

DETAILED DESCRIPTION

Figure 1:
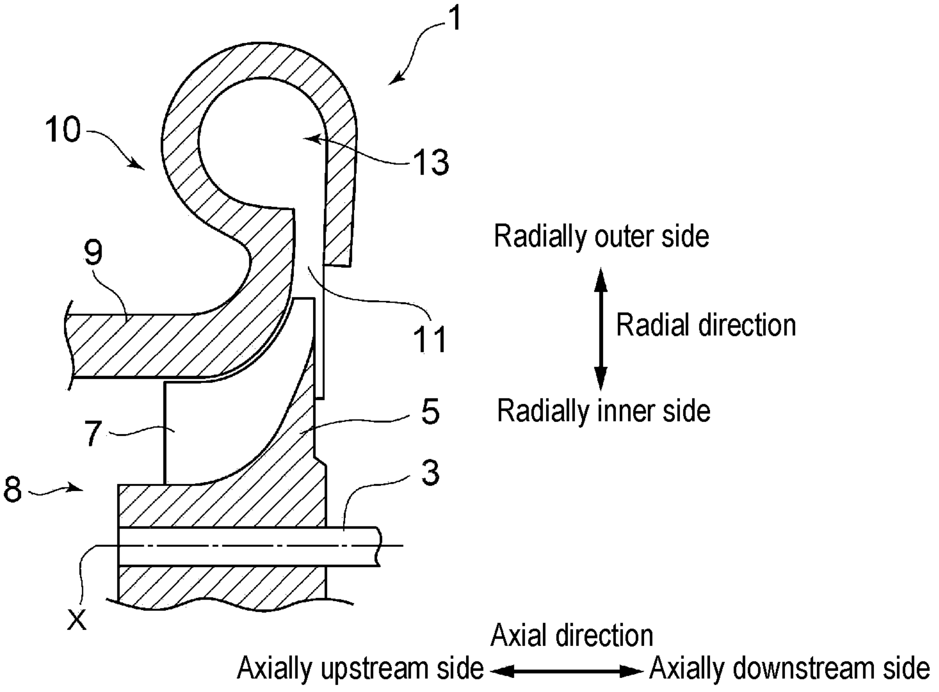
FIG. 1 is a cross-sectional schematic view of a centrifugal compressor according to some embodiments.

Some embodiments of the present invention will be described below with reference to the accompanying drawings. It is intended, however, that unless particularly identified, dimensions, materials, shapes, relative positions and the like of components described or shown in the drawings as the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same", "equal", and "uniform" shall not be construed as indicating only the state in which the feature is strictly equal, but also includes a state in which there is a tolerance or a difference that can still achieve the same function.

Further, for instance, an expression of a shape such as a rectangular shape or a tubular shape shall not be construed as only the geometrically strict shape, but also includes a shape with unevenness or chamfered corners within the range in which the same effect can be achieved.

On the other hand, the expressions "comprising", "including", "having", "containing", and "constituting" one constituent component are not exclusive expressions that exclude the presence of other constituent components.

FIG. 1 is a cross-sectional schematic view of a centrifugal compressor 1 according to some embodiments. The centrifugal compressor 1 according to some embodiments is the centrifugal compressor 1 applied to a turbocharger. In the centrifugal compressor 1 according to some embodiments, a compressor wheel 8 and a turbine wheel of a turbine (not shown) are coupled by a rotational shaft 3. The compressor wheel 8 includes a plurality of compressor blades 7 erecting on the surface of a hub 5. The compressor wheel 8 is covered with a compressor housing (casing) 9 on the outer side of the compressor blades 7. In the centrifugal compressor 1 according to some embodiments, a diffuser 11 is formed on the outer peripheral side of the compressor blades 7, and in addition, a scroll flow passage 13 formed into a scroll shape is disposed in the periphery of the diffuser 11.

Figure 2:
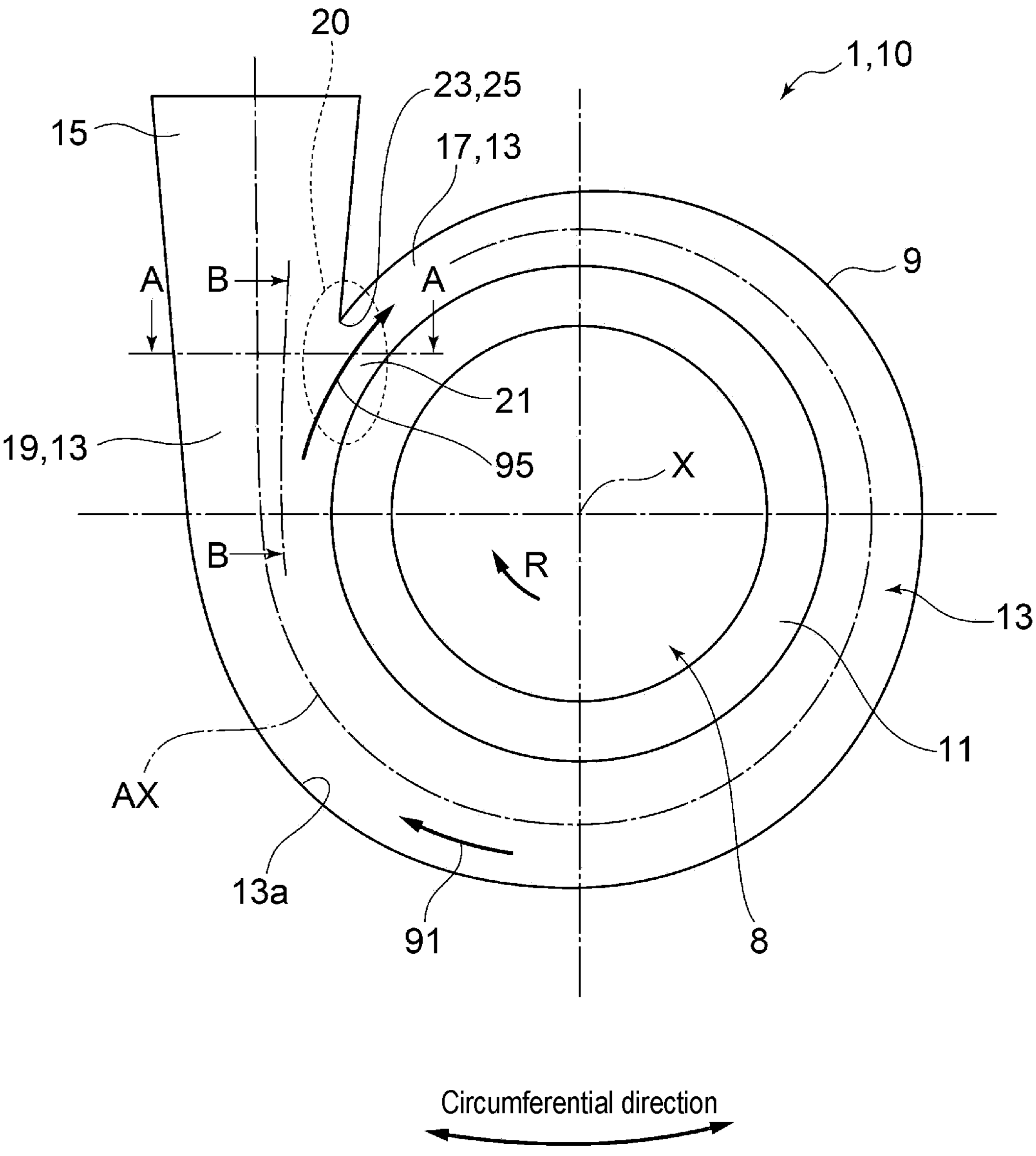
FIG. 2 is a view schematically showing a cross-section of a casing in the centrifugal compressor cut off at a cross-section orthogonal to the axis direction of a rotational shaft in the centrifugal compressor according to some embodiments.

FIG. 2 is a view schematically showing a cross-section of the casing 9 in the centrifugal compressor 1 cut off at a cross-section orthogonal to the direction of an axis X of the rotational shaft 3 in the centrifugal compressor 1 according to some embodiments. The casing 9 includes the scroll flow passage 13, and an outlet flow passage 15 connected to the downstream side of the scroll flow passage 13. The scroll flow passage 13 includes a scroll start portion 17 and a scroll end portion 19 of the scroll flow passage. The scroll flow passage 13 is formed such that a flow passage cross-sectional area thereof increases as the scroll flow passage 13 moves clockwise as shown in FIG. 2 from the scroll start portion 17.

In FIG. 2, an arrow R indicates the rotational direction of the compressor wheel 8. In the centrifugal compressor 1 according to some embodiments, the compressor wheel 8 rotates clockwise in FIG. 2.

A fluid flow in the scroll flow passage 13 involves a main flow 91 (see FIG. 2) of a circumferential flow from the scroll start portion 17 to the scroll end portion 19, and a swirl flow 93 (see FIG. 4 to be described later) flowing while swirling in the scroll flow passage 13 along the main flow.

In the following description, the direction of the axis X of the rotational shaft 3 of the centrifugal compressor 1 may be referred to as the axial direction of the centrifugal compressor 1 or may simply be referred to as the axial direction. Of the axial direction, an upstream side along the flow of the fluid flowing into the centrifugal compressor 1 is an axially upstream side, and a side opposite thereto is an axially downstream side. Further, in the following description, the radial direction of the compressor wheel 8 of the centrifugal compressor 1 may be referred to as the radial direction of the centrifugal compressor 1 or may simply be referred to as the radial direction. Of the radial direction, a direction close to the axis X of the rotational shaft 3 is a radially inner side, and a direction away from the axis X of the rotational shaft 3 is a radially outer side.

Further, in the scroll flow passage 13 and the outlet flow passage 15, of an extension direction of the flow passages, an upstream side of the main flow of the fluid will be referred to as an upstream side of the scroll flow passage 13 and an upstream side of the outlet flow passage 15, and a downstream side of the main flow of the fluid will be referred to as a downstream side of the scroll flow passage 13 and a downstream side of the outlet flow passage 15. The upstream side of the scroll flow passage 13 and the upstream side of the outlet flow passage 15 may each be referred to as a flow passage upstream side or simply be referred to as the upstream side, and the downstream side of the scroll flow passage 13 and the downstream side of the outlet flow passage 15 may each be referred to as a flow passage downstream side or simply be referred to as the downstream side In the scroll flow passage 13, the extension direction of the scroll flow passage 13 is substantially the same direction as the circumferential direction of the centrifugal compressor 1.

In a scroll structure 10 of the centrifugal compressor 1 according to some embodiments, the casing 9 forms a flow passage connection section 20 where the scroll start portion 17 and the scroll end portion 19 of the scroll flow passage 13 intersect. In the flow passage connection section 20, in the scroll end portion 19 of an inner circumferential surface 13*a* of the scroll flow passage 13, an opening portion 21 communicating with the scroll start portion 17 is formed. Of an opening forming portion 23 enclosing the opening portion 21, at a position on the most downstream side of the scroll flow passage 13, a tongue portion 25 is formed which separates the scroll flow passage 13 and the outlet flow passage 15 from each other.

Figure 3:
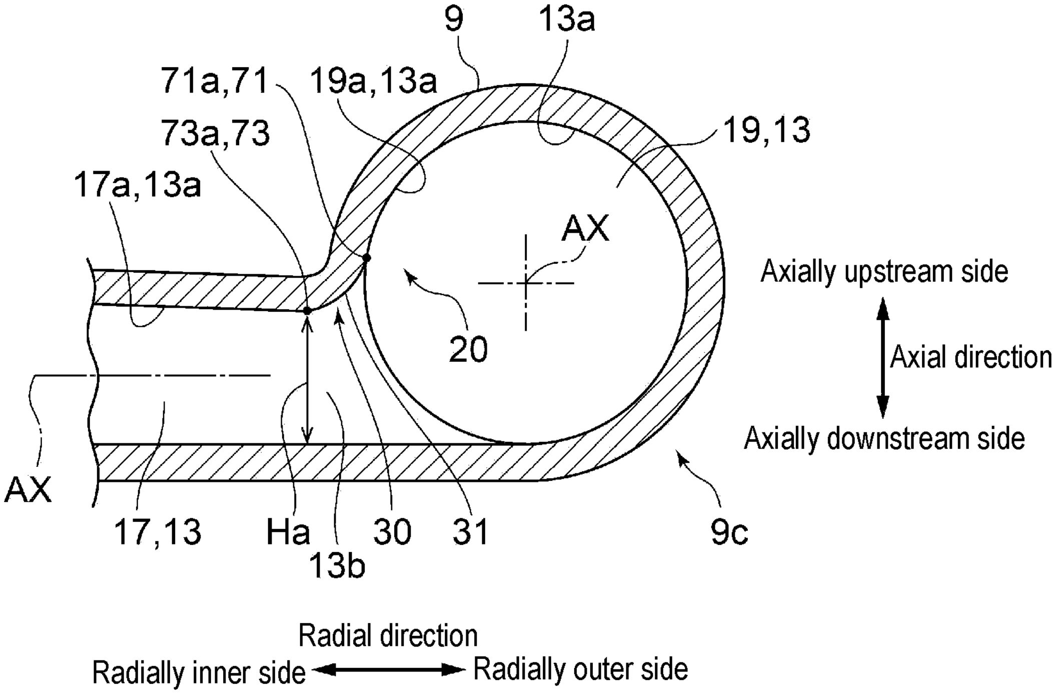
FIG. 3 is an arrow view of a cross-section along line A-A in FIG. 2.

FIG. 3 is an arrow view of a cross-section along line A-A in FIG. 2. That is, FIG. 3 is a schematic cross-sectional view of the casing 9 when the casing 9 is cut off at a cross-section extending in a direction orthogonal to the extension direction of the scroll end portion 19 at a position including the flow passage connection section 20. FIG. 3 and FIGS. 4 to 7 to be described later each represent a first cross-section 9*c* which is a cross-section orthogonal to an extension direction of a center line AX of the scroll flow passage 13 in a connection region 30 to be described later. FIG. 3 is also a view where the inside of the scroll flow passage 13 in the scroll end portion 19 is viewed on the upstream side from the downstream side of the outlet flow passage 15. FIG. 3 omits the illustration of the diffuser 11.

Figure 4:
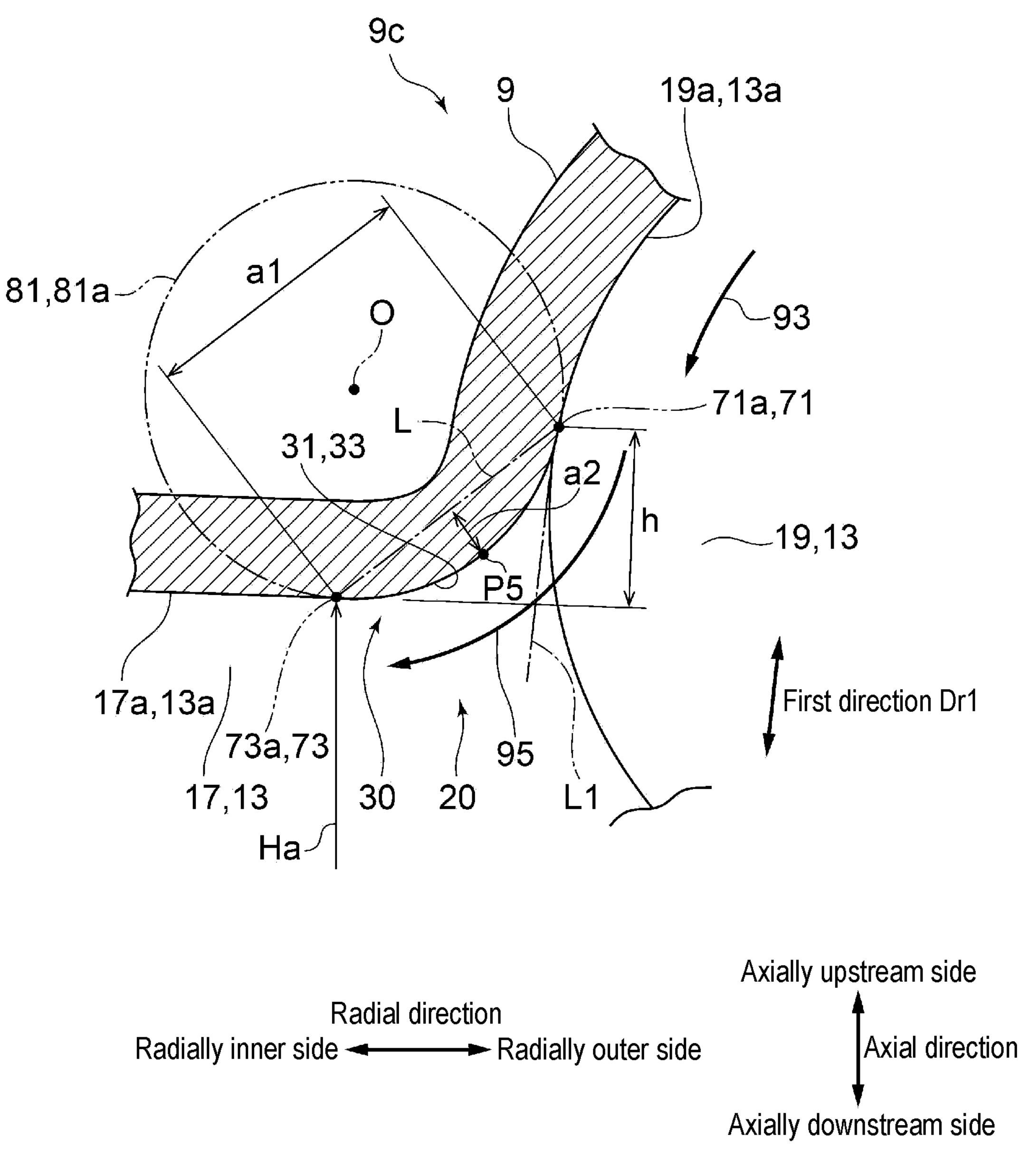
FIG. 4 is an enlarged view of the vicinity of a flow passage connection section in FIG. 3.

FIG. 4 is an enlarged view of the vicinity of the flow passage connection section 20 in FIG. 3, and is a view showing an embodiment of the connection region 30 to be described later.

Figure 5:
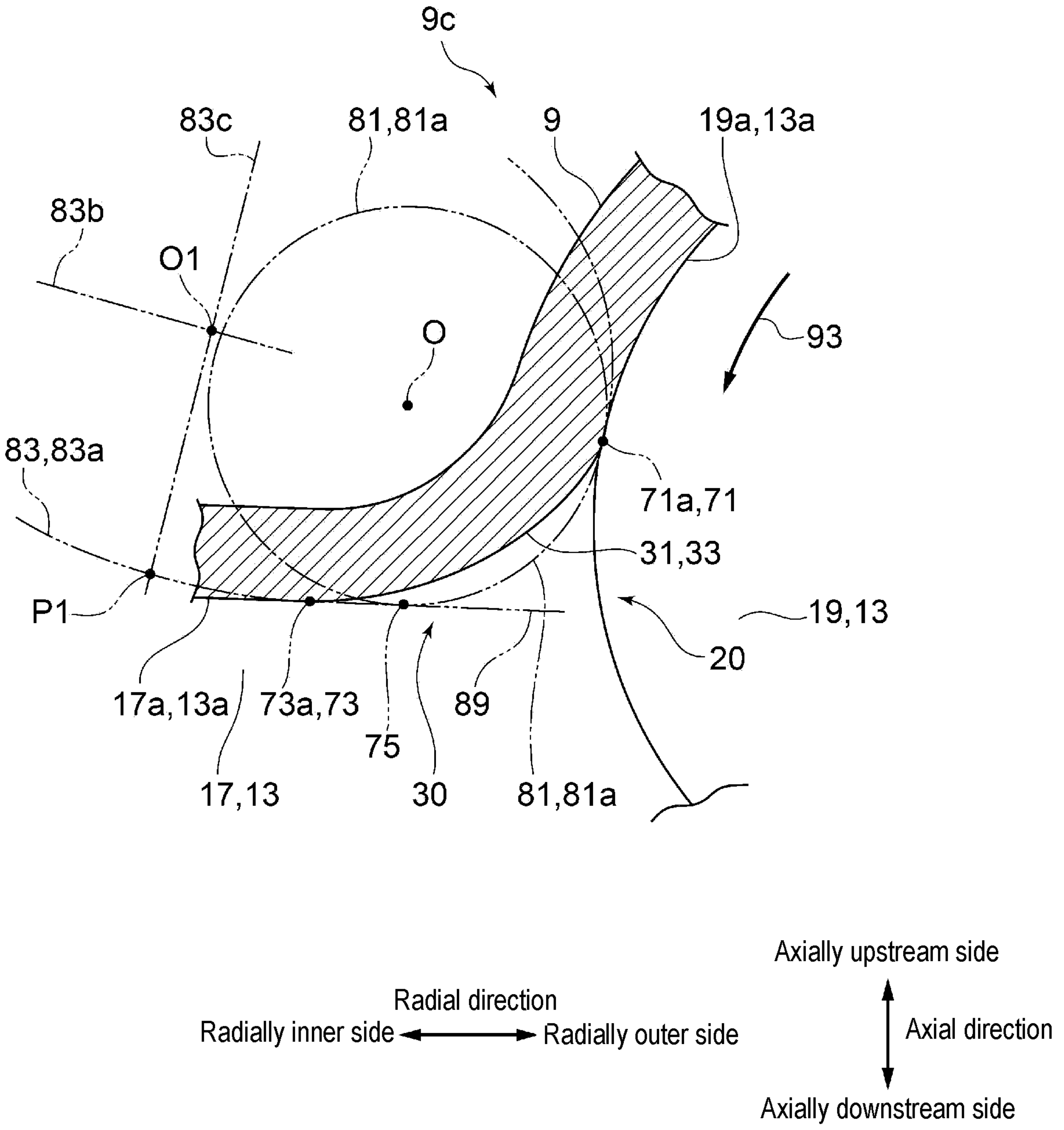
FIG. 5 is a view corresponding to the enlarged view of the vicinity of the flow passage connection section in FIG. 3.

FIG. 5 is a view corresponding to the enlarged view of the vicinity of the flow passage connection section 20 in FIG. 3, and is a view showing another embodiment of the connection region 30.

Figure 6:
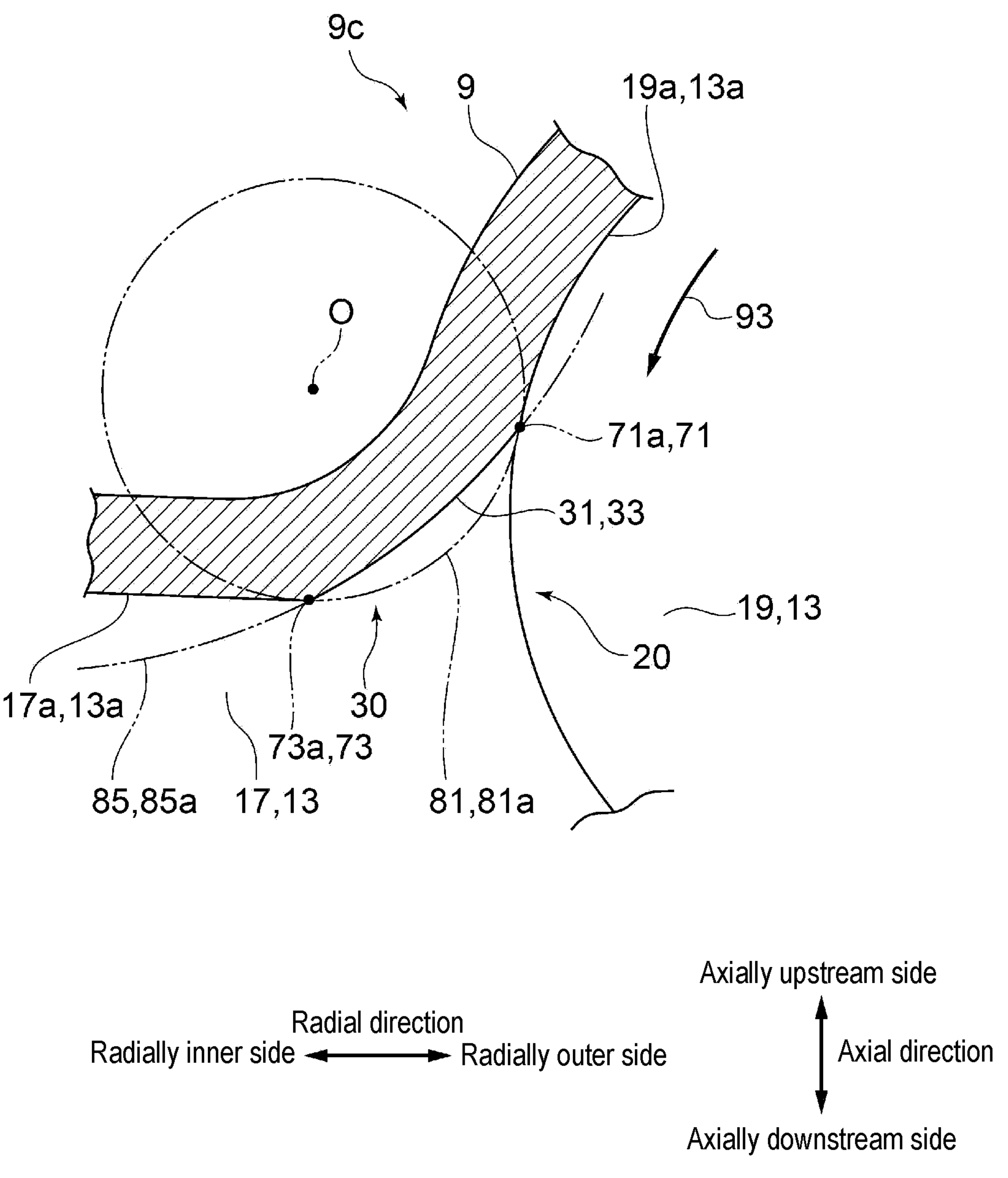
FIG. 6 is a view corresponding to the enlarged view of the vicinity of the flow passage connection section in FIG. 3.

FIG. 6 is a view corresponding to the enlarged view of the vicinity of the flow passage connection section 20 in FIG. 3, and is a view showing still another embodiment of the connection region 30.

Figure 7:
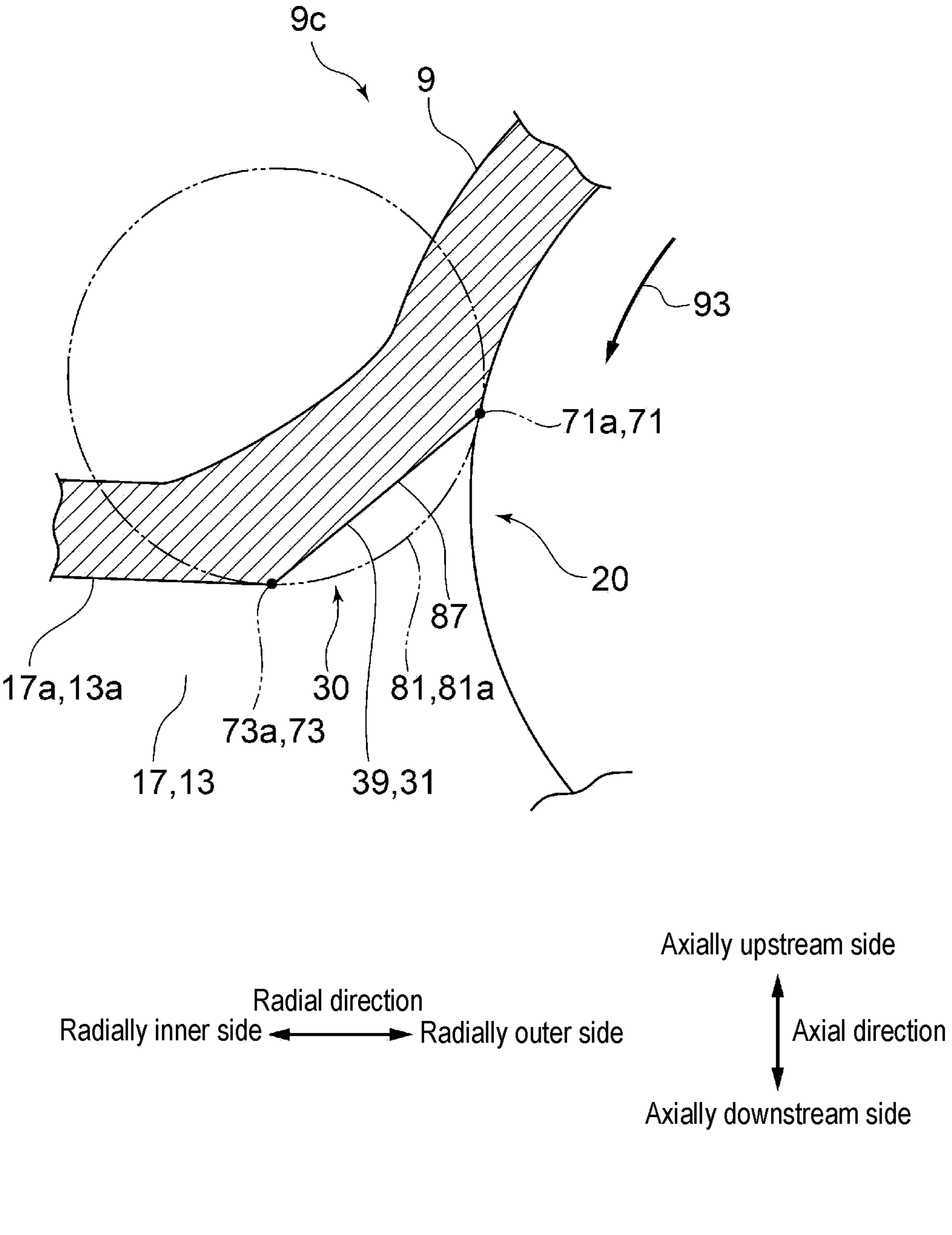
FIG. 7 is a view corresponding to the enlarged view of the vicinity of the flow passage connection section in FIG. 3.

FIG. 7 is a view corresponding to the enlarged view of the vicinity of the flow passage connection section 20 in FIG. 3, and is a view showing yet another embodiment of the connection region 30.

Figure 8:
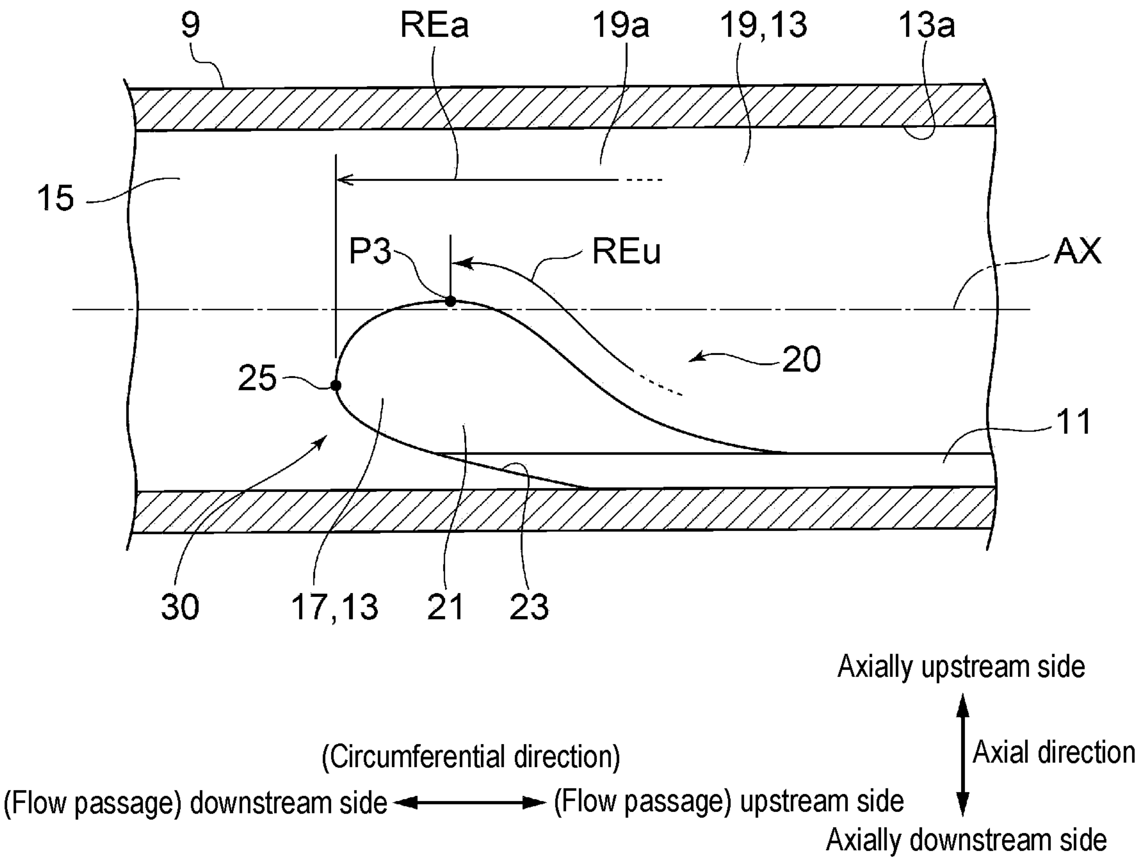
FIG. 8 is an arrow view of a cross-section along line B-B in FIG. 2.

FIG. 8 is an arrow view of a cross-section along line B-B in FIG. 2.

For example, as shown in FIGS. 3 and 8, in some embodiments, the flow passage connection section 20 includes the connection region 30 where, of the flow passage connection section 20, a first inner circumferential surface 19*a* of the scroll end portion 19 in the centrifugal compressor 1 and a second inner circumferential surface 17*a* of the scroll start portion 17 in the centrifugal compressor 1 are connected. Hereinafter, the connection region 30 according to some embodiments will be described in detail.

At a high-flow operating point, an accelerating flow is formed from the scroll start portion 17 to the scroll end portion 19, and a pressure in the scroll start portion 17 is higher than a pressure in the scroll end portion 19, rarely causing a recirculation flow 95 (see FIG. 4) from the scroll end portion 19 to the scroll start portion 17 in the flow passage connection section 20.

However, at a low-flow operating point, a decelerating flow is formed from the scroll start portion 17 to the scroll end portion 19, and the pressure in the scroll start portion 17 is lower than the pressure in the scroll end portion 19, causing the recirculation flow 95 from the scroll end portion 19 to the scroll start portion 17 in the flow passage connection section 20. The above phenomenon causes a separation loss or the like in the scroll flow passage 13.

That is, a fluid flow direction is changed in the flow passage connection section 20 when the recirculation flow 95 flows into the scroll start portion 17 from the scroll end portion 19, causing the loss if the fluid separates from a wall surface (second inner circumferential surface 17*a*) forming the scroll flow passage 13 in the scroll start portion 17.

Thus, in some embodiments, the above-described separation is suppressed by setting the form of the connection region 30 to a form to be described below.

In some embodiments shown in FIGS. 3 to 7, the connection region 30 includes a turning start point 71 where a direction starts to change from the first inner circumferential surface 19*a* toward the second inner circumferential surface 17*a*, and a turning end point 73 where the change in direction from the first inner circumferential surface 19*a* toward the second inner circumferential surface 17*a* comes to an end. The turning start point 71 on the first cross-section 9*c* is a first turning start point 71*a*, and the turning end point 73 on the first cross-section 9*c* is a first turning end point 73*a*. Further, for example, as shown in FIG. 4, an extension direction of a tangent line L1 (tangent direction) to the first inner circumferential surface 19*a* passing through the first turning start point 71*a* on the first cross-section 9*c* will be referred to as a first direction Dr1.

For example, in the case of some embodiments shown in FIGS. 3 to 6, the position of the turning start point 71 may be an intersection of the first inner circumferential surface 19*a* and an arc of a virtual inscribed circle, a virtual inscribed ellipse, a virtual circle, or a virtual ellipse to be described later, or a position where the direction starts to change from the first inner circumferential surface 19*a* toward the arc to be connected to the arc. Likewise, in the case of some embodiments shown in FIGS. 3 to 6, the position of the turning end point 73 may be an intersection of the second inner circumferential surface 17*a* and the arc, or a position where the direction starts to change from the second inner circumferential surface 17*a* toward the arc to be connected to the arc.

Further, for example, in the case of another embodiment shown in FIG. 7, the position of the turning start point 71 may be an intersection of the first inner circumferential surface 19*a* and a straight line 87 to be described later, or a position where the direction starts to change from the first inner circumferential surface 19*a* toward the straight line 87 to be connected to the straight line 87. Likewise, in the case of still another embodiment shown in FIG. 7, the position of the turning end point 73 may be an intersection of the second inner circumferential surface 17*a* and the straight line 87, or a position where the direction starts to change from the second inner circumferential surface 17*a* toward the straight line 87 to be connected to the straight line 87.

Further, in some embodiments shown in FIGS. 3 to 7, the first turning start point 71*a* exists at a position away from the first turning end point 73*a* along the above-described first direction Dr1 by a distance h not less than 30% of a height dimension Ha along the axial direction of the centrifugal compressor 1 at a minimum cross-sectional area position 13*b* (see FIG. 3) of the scroll flow passage 13. In other words, in some embodiments, in at least a part of the connection region 30, the positional relationship between the first turning start point 71*a* and the first turning end point 73*a* is preferably the above-described relationship. In some embodiments shown in FIGS. 3 to 7, it is more preferable that the turning start point 71 exists at a position away from the first turning end point 73*a* along the first direction Dr1 by the distance h not less than 50% of the above-described height dimension Ha.

In the connection region 30 in the flow passage connection section 20, an extension direction of the inner circumferential surface 13*a* of the scroll flow passage 13 changes relatively largely from the first inner circumferential surface 19*a* of the scroll end portion 19 to the second inner circumferential surface 17*a* of the scroll start portion 17. Thus, the fluid flowing along the first inner circumferential surface 19*a* is likely to separate from the second inner circumferential surface 17*a* when flowing into the scroll start portion 17 as the recirculation flow 95.

To cope therewith, in some embodiments shown in FIGS. 3 to 7, the first turning start point 71*a* exists at the position away from the first turning end point 73*a* along the first direction Dr1 by the distance h not less than 30% of the height dimension Ha along the axial direction at the minimum cross-sectional area position 13*b* of the scroll flow passage 13. Thus, the change in direction of the inner circumferential surface 13*a* of the scroll flow passage 13 changing from the first inner circumferential surface 19*a* to the second inner circumferential surface 17*a* becomes slow, the fluid flowing along the first inner circumferential surface 19*a* is unlikely to separate from the second inner circumferential surface 17*a* when flowing into the scroll start portion 17 as the recirculation flow 95, making it possible to suppress the loss associated with the separation. Therefore, in the centrifugal compressor 1 according to some embodiments, it is possible to increase efficiency in a broad operational range.

In the connection region 30 according to an embodiment shown in FIG. 3, 4, the first inner circumferential surface 19*a* and the second inner circumferential surface 17*a* are connected by an arc 81*a* of a virtual inscribed circle 81 in contact with the first inner circumferential surface 19*a* at the first turning start point 71*a* and in contact with the second inner circumferential surface 17*a* at the first turning end point 73*a*. The virtual inscribed circle 81 is a true circle.

That is, a connection surface 31 which is the inner circumferential surface 13*a* of the scroll flow passage 13 in the connection region 30 according to an embodiment shown in FIG. 3, 4 coincides with a part of the arc 81*a* of the virtual inscribed circle 81 in the first cross-section 9*c*.

In the following description, a position through which the center, that is, the center line AX of the scroll flow passage 13 passes is the center of gravity (centroid) of the scroll flow passage 13 in the above-described virtual cut surface.

In the connection region 30 according to another embodiment shown in FIG. 5, the first inner circumferential surface 19*a* and the second inner circumferential surface 17*a* are connected by an arc 83*a* of a virtual inscribed ellipse 83 in contact with the first inner circumferential surface 19*a* at the first turning start point 71*a* and in contact with the second inner circumferential surface 17*a* at the first turning end point 73*a*. In the connection region 30 according to another embodiment shown in FIG. 5, the virtual inscribed ellipse 83 has a major axis 83*b* oriented in the radial direction of the centrifugal compressor 1, and a minor axis 83*c* oriented in the axial direction of the centrifugal compressor 1.

That is, the connection surface 31 of the connection region 30 according to another embodiment shown in FIG. 5 coincides with a part of the arc 83*a* of the virtual inscribed ellipse 83 in the first cross-section 9*c*.

In the connection region 30 according to still another embodiment shown in FIG. 6, the center of a curvature exists on the axially inner side of the first turning start point 71*a*, and the first turning start point 71*a* and the first turning end point 73*a* are connected by an arc 85*a* of the virtual circle 85 whose curvature radius is larger than that of the above-described virtual inscribed circle 81.

That is, the connection surface 31 of the connection region 30 according to still another embodiment shown in FIG. 6 coincides with a part of the arc 85*a* of the virtual circle 85 in the first cross-section 9*c*.

In the connection region 30 according to still another embodiment shown in FIG. 6, the virtual circle 85 is a true circle. However, the virtual circle 85 may be an ellipse (virtual ellipse). If the virtual circle 85 is the ellipse (virtual ellipse), the virtual ellipse preferably has a major axis oriented in the radial direction of the centrifugal compressor 1, and a minor axis oriented in the axial direction of the centrifugal compressor 1.

Unlike the connection region 30 according to still another embodiment shown in FIG. 6 and the connection region 30 according to yet another embodiment shown in FIG. 7 to be described later, the connection surface 31 may not necessarily internally contact the first inner circumferential surface 19*a* and the second inner circumferential surface 17*a*. The connection surface 31 may internally contact one of the first inner circumferential surface 19*a* or the second inner circumferential surface 17*a* and may not internally contact the other, or may not internally contact neither the first inner circumferential surface 19*a* nor the second inner circumferential surface 17*a*.

In the connection region 30 according to yet another embodiment shown in FIG. 7, the first inner circumferential surface 19*a* and the second inner circumferential surface 17*a* are connected by a straight line joining the first turning start point 71*a* and the first turning end point 73*a*.

That is, the connection surface 31 of the connection region 30 according to yet another embodiment shown in FIG. 7 coincides with the straight line 87 ranging from the first turning start point 71*a* to the first turning end point 73*a* in the first cross-section 9*c*. The connection surface 31 of the connection region 30 according to yet another embodiment shown in FIG. 7 will also be referred to as a straight line portion 39.

In the connection region 30 according to an embodiment shown in FIG. 3, 4, as described above, the connection surface 31 coincides with a part of the arc 81*a* of the virtual inscribed circle 81 in contact with the first inner circumferential surface 19*a* at the first turning start point 71*a* and in contact with the second inner circumferential surface 17*a* at the first turning end point 73*a*.

Further, in the connection region 30 according to another embodiment shown in FIG. 5, the connection surface 31 exists at a position on the side of a center O of the virtual inscribed circle 81 relative to the position of the above-described virtual inscribed circle 81. The virtual inscribed circle 81 is a virtual inscribed circle which is in contact with the first inner circumferential surface 19*a* at the first turning start point 71*a* and in contact with a virtual line 89 obtained by extending the second inner circumferential surface 17*a* at the first turning end point 73*a* along the extension direction of the scroll flow passage 13.

In the connection region 30 according to still another embodiment shown in FIG. 6 and yet another embodiment shown in FIG. 7, the connection surface 31 exists at the position on the side of the center O of the virtual inscribed circle 81 relative to the position of the above-described virtual inscribed circle 81.

That is, in some embodiments shown in FIGS. 3 to 7, at least at an intermediate position between the first turning start point 71*a* and the first turning end point 73*a*, the connection region 30 exists at the same position as the virtual inscribed circle 81 or at the position on the side of the center O of the virtual inscribed circle 81 relative to the position in question. The virtual inscribed circle 81 is in contact with the first inner circumferential surface 19*a* at the first turning start point 71*a* and in contact with the virtual line 89 obtained by extending the second inner circumferential surface 17*a* at the first turning end point 73*a* along the extension direction of the scroll flow passage 13.

Thus, since the change in direction of the inner circumferential surface 13*a* of the scroll flow passage 13 changing from the first inner circumferential surface 19*a* to the second inner circumferential surface 17*a* becomes slow, the fluid flowing along the first inner circumferential surface 19*a* is unlikely to separate from the second inner circumferential surface 17*a* when flowing into the scroll start portion 17 as the recirculation flow 95, making it possible to suppress the loss associated with the separation.

For example, as in another embodiment shown in FIG. 5, the first turning end point 73*a* is located on the downstream side of the scroll flow passage 13 (scroll start portion 17) relative to a position (contact position) 75 where the above-described virtual inscribed circle 81 contacts the above-described virtual line 89.

Thus, as compared with a case in which the first turning end point 73*a* is set at the contact position 75 where the above-described virtual inscribed circle 81 contacts the above-described virtual line 89, it is possible to set the position of the first turning end point 73*a* on the downstream side of the scroll flow passage 13 (scroll start portion 17). Thus, the change in direction of the inner circumferential surface 13*a* of the scroll flow passage 13 changing from the first inner circumferential surface 19*a* to the second inner circumferential surface 17*a* becomes slower. Therefore, the fluid flowing along the first inner circumferential surface 19*a* is more unlikely to separate from the second inner circumferential surface 17*a* when flowing into the scroll start portion 17 as the recirculation flow 95, making it possible to further suppress the loss associated with the separation.

The first turning end point 73*a* may be shifted to the downstream side of the scroll flow passage 13 (scroll start portion 17) relative to the contact position 75 by shifting the position of the arc 85*a* of the virtual circle 85 according to still another embodiment shown in FIG. 6, by changing the oblateness of the virtual circle 85, or by changing the curvature radius of the virtual circle 85.

Alternatively, the first turning end point 73*a* may be shifted to the downstream side of the scroll flow passage 13 (scroll start portion 17) relative to the contact position 75 by changing an inclination angle of the straight line portion 39 according to yet another embodiment shown in FIG. 7.

For example, as in some embodiments shown in FIGS. 3 to 6, the connection region 30 may have a curved portion 33 ranging from the first turning start point 71*a* to the first turning end point 73*a*.

Connecting the first turning start point 71*a* and the first turning end point 73*a* by the curved portion 33, it is possible to suppress the loss of the fluid passing along the connection region 30.

If the connection region 30 has the curved portion 33, for example, as in some embodiments shown in FIGS. 3 to 6, the curvature radius of the curved portion 33 may gradually increase from the first turning start point 71*a* toward the first turning end point 73*a*. For example, in another embodiment shown in FIG. 5, the first inner circumferential surface 19*a* and the second inner circumferential surface 17*a* are connected by the arc 83*a* of the virtual inscribed ellipse 83. In this case, as shown in FIG. 5, if an intersection P1 of the minor axis 73*c* and the arc 83*a* on the axially downstream side of a center O1 of the virtual inscribed ellipse 83 is located on the downstream side of the scroll flow passage 13 (scroll start portion 17) relative to the first turning end point 73*a*, the arc 83*a* of the virtual inscribed ellipse 83 gradually increases in curvature radius from the first turning start point 71*a* toward the first turning end point 73*a*.

Thus, the change in direction of the inner circumferential surface 13*a* of the scroll flow passage 13 changing from the first inner circumferential surface 19*a* to the second inner circumferential surface 17*a* becomes slow toward the second inner circumferential surface 17*a*. Thus, the fluid flowing along the first inner circumferential surface 19*a* is more unlikely to separate from the second inner circumferential surface 17*a* when flowing into the scroll start portion 17 as the recirculation flow 95, making it possible to further suppress the loss associated with the separation.

For example, as in yet another embodiment shown in FIG. 7, the connection region 30 may have the straight line portion 39 in at least a partial area ranging from the first turning start point 71*a* to the first turning end point 73*a*.

Connecting the at least partial area between the first turning start point 71*a* and the first turning end point 73*a* by the straight line portion 39, it is possible to shorten a distance (creepage distance) along the connection surface 31 between the first turning start point 71*a* and the first turning end point 73*a*, and to suppress the loss of the fluid passing along the connection region 30.

In some embodiments described above, in the first cross-section 9*c*, that is, a cross-section appearing on the drawings of FIGS. 3 to 6, the curvature of the curved portion 33 may be different in curvature radius depending on the position between the first turning start point 71*a* and the first turning end point 73*a* to have a different curved line from the arc 83*a* of the virtual inscribed ellipse 83. That is, the shape of the curved portion 33 appearing in the first cross-section 9*c* may be the shape of the curved line represented by an exponential function, and the curvature radius may increase/decrease from the first turning start point 71*a* toward the first turning end point 73*a*.

Further, in some embodiments described above, in the first cross-section 9*c*, that is, the cross-section appearing on the drawing of FIG. 7, the straight line portion 39 may have not less than two connected straight lines different in extension direction, and may have a bending point between the first turning start point 71*a* and the first turning end point 73*a*.

Further, in yet another embodiment shown in FIG. 7, the first inner circumferential surface 19*a* and the straight line portion 39 may be connected by a curved line, such as an arc, at the first turning start point 71*a*. Likewise, in yet another embodiment shown in FIG. 7, the straight line portion 39 and the second inner circumferential surface 17*a* may be connected by a curved line, such as an arc, at the first turning end point 73*a*.

Hereinafter, the connection region 30 according to some embodiments will further be described with reference to FIG. 8 as well. FIG. 8 is an arrow view of a cross-section along line B-B in FIG. 2, that is, a schematic cross-sectional view of the casing 9 when the casing 9 is cut off at a cross-section extending in substantially the same direction as the extension direction of the scroll end portion 19 and extending in the axial direction of the centrifugal compressor 1. FIG. 8 is also a view where the inside of the scroll flow passage 13 in the scroll end portion 19 is viewed from the radially outer side of the centrifugal compressor 1.

As shown in FIG. 8, in the flow passage connection section 20 according to some embodiments, the opening portion 21 is disposed in a partial section along the extension direction (circumferential direction) of the scroll flow passage 13. In the flow passage connection section 20 according to some embodiments, the connection region 30 exists in the opening forming portion 23 enclosing the opening portion 21. In the flow passage connection section 20 according to some embodiments, the connection region 30 is configured such that, as the scroll end portion 19 (first inner circumferential surface 19*a*) is viewed from the radially outer side of the centrifugal compressor 1, an area on the axially upstream side and the axially downstream side of the tongue portion 25 exists along the extension direction of the center line AX of the scroll flow passage 13 in the scroll end portion 19.

Further, in the flow passage connection section 20 according to some embodiments, the connection region 30 first heads for the axially upstream side of the centrifugal compressor 1 to reach a position P3 on the most axially upstream side, and then extends toward the axially downstream side, as the connection region 30 moves from the most downstream side toward the upstream side (the upstream side of the flow passage) along the extension direction of the center line AX of the scroll flow passage 13, on the axially upstream side of the tongue portion 25 and on the upstream side of the flow passage.

For example, as shown in FIG. 4, reference character a1 denotes a distance of a straight line L joining the first turning start point 71*a* and the first turning end point 73*a* in the first cross-section 9*c*, and reference character a2 denotes a distance from the straight line L to a farthest position P5 on the connection region. The connection region 30 according to some embodiments includes an area where a ratio (a2/a1) of the distance a2 to the distance a1 decreases from the downstream side toward the upstream side along the extension direction of the center line AX.

As described above, the connection region 30 extends along the extension direction of the center line AX of the scroll flow passage 13 in the scroll end portion 19, as the scroll end portion 19 is viewed from the radially outer side of the centrifugal compressor 1.

As a result of intensive researches by the present inventors, it was found that the separation is more likely to occur in the fluid flowing into the scroll start portion 17 from the upstream area of the connection region 30 along the extension direction than in the fluid flowing into the scroll start portion 17 from the downstream area of the connection region 30 along the extension direction.

According to some embodiments described above, since the connection region 30 includes the area where the above-described ratio (a2/a1) decreases from the downstream side toward the upstream side along the extension direction of the center line AX of the scroll flow passage 13, an area exists where the change in direction of the inner circumferential surface 13*a* of the scroll flow passage 13 changing from the first inner circumferential surface 19*a* to the second inner circumferential surface 17*a* becomes slow from the downstream side toward the upstream side along the extension direction.

Therefore, according to some embodiments described above, it is possible to effectively suppress occurrence of the separation.

Further, in the flow passage connection section 20 according to some embodiments, the above-described ratio (a2/a1) takes a minimum value in an area REa, of the connection region 30, on the upstream side of the scroll flow passage 13 relative to the position of the tongue portion 25.

As described above, the above-described separation is more likely to occur in the fluid flowing into the scroll start portion 17 from the upstream area of the connection region 30 along the extension direction of the center line AX of the scroll flow passage 13 than in the fluid flowing into the scroll start portion 17 from the downstream area of the connection region 30 along the extension direction.

According to some embodiments described above, since the above-described ratio (a2/a1) takes the minimum value in the above-described area REa, the change in direction of the inner circumferential surface 13*a* of the scroll flow passage 13 changing from the first inner circumferential surface 19*a* to the second inner circumferential surface 17*a* becomes slow.

Therefore, according to some embodiments described above, it is possible to effectively suppress occurrence of the separation.

Further, in the flow passage connection section 20 according to some embodiments, the above-described ratio (a2/a1) takes the minimum value in an area REu, of the connection region 30, on the upstream side of the flow passage relative to the position P3 on the most axially upstream side. In some embodiments, the area REu is an area on the upstream side of the flow passage relative to the above-described position P3 of the area located on the axially upstream side of the opening portion 21, of the opening forming portion 23.

As described above, the connection region 30 according to some embodiments first heads for the axially upstream side of the centrifugal compressor 1 to reach the position P3 on the most axially upstream side, and then extends toward the axially downstream side, as the connection region 30 moves from the tongue portion 25 toward the upstream side of the flow passage.

Further, as described above, the above-described separation is more likely to occur in the fluid flowing into the scroll start portion 17 from the area of the connection region 30 on the upstream side of the flow passage than in the fluid flowing into the scroll start portion 17 from the area of the connection region 30 on the downstream side of the flow passage.

However, an area of the scroll start portion 17 suffering the most from the loss due to the separation in the scroll flow passage 13 is an area reached by the fluid passing through the connection region 30 at the position on the upstream side of the flow passage relative to the above-described position P3, that is, the fluid passing through the area REu.

Therefore, disposing the connection region 30 such that the above-described ratio (a2/a1) takes the minimum value in the above-described area REu, the change in direction of the inner circumferential surface 13*a* of the scroll flow passage 13 changing from the first inner circumferential surface 19*a* to the second inner circumferential surface 17*a* can be made much slower in an area (area REu) of the connection region 30 which is passed by the fluid flowing into the area where the loss due to the separation is relatively large. Thus, it is possible to effectively suppress occurrence of the separation.

The present invention is not limited to the above-described embodiments, and also includes an embodiment obtained by modifying the above-described embodiments and an embodiment obtained by combining these embodiments as appropriate.

REFERENCE SIGNS LIST

1 Centrifugal compressor
9 Compressor housing (casing)
13 Scroll flow passage
15 Outlet flow passage
17 Scroll start portion
17*a* Second inner circumferential surface
19 Scroll end portion
19*a* First inner circumferential surface
20 Flow passage connection section
25 Tongue portion
30 Connection region
31 Connection surface
71 Turning start point
73 Turning end point

The invention claimed is:

1. A scroll structure of a centrifugal compressor provided with a scroll flow passage formed into a scroll shape, comprising:

a flow passage connection section where a scroll start portion and a scroll end portion of the scroll flow passage intersect, a connection region where a first inner circumferential surface of the scroll end portion in the centrifugal compressor and a second inner circumferential surface of the scroll start portion in the centrifugal compressor are connected, wherein the connection region includes a turning start point where a direction starts to change from the first inner circumferential surface toward the second inner circumferential surface, and a turning end point where the change in direction from the first inner circumferential surface toward the second inner circumferential surface comes to an end, and wherein, where a cross-section orthogonal to an extension direction of a center line of the scroll flow passage in the connection region is a first cross-section, the turning start point on the first cross-section is a first turning start point, a turning end point on the first cross-section is a first turning end point, and a tangent line to the first inner circumferential surface passing through the first turning start point on the first cross-section is a first direction, the first turning start point exists at a position away from the first turning end point along the first direction by a distance not less than 30% of a height dimension along an axial direction of the centrifugal compressor at a minimum cross-sectional area position of the scroll flow passage, and wherein the connection region includes a curved portion ranging from the first turning start point to the first turning end point.

2. The scroll structure of the centrifugal compressor according to claim 1, wherein, at least at an intermediate position between the first turning start point and the first turning end point, the connection region exists at the same position as a virtual inscribed circle or at a position on a center side of the virtual inscribed circle relative to the position in question, the virtual inscribed circle being in contact with the first inner circumferential surface at the first turning start point and in contact with a virtual line obtained by extending the second inner circumferential surface at the first turning end point along an extension direction of the scroll flow passage.

3. The scroll structure of the centrifugal compressor according to claim 1, wherein the first turning end point is located on a downstream side of the scroll flow passage relative to a position where a virtual inscribed circle contacts a virtual line obtained by extending the second inner circumferential surface at the first turning end point along an extension direction of the scroll flow passage, the virtual inscribed circle being in contact with the first inner circumferential surface at the first turning start point and in contact with the virtual line.

4. The scroll structure of the centrifugal compressor according to claim 1, wherein the curved portion has a curvature radius gradually increasing from the first turning start point toward the first turning end point.

5. A centrifugal compressor, comprising:

the scroll structure of the centrifugal compressor according to claim 1.

* * * * *